United States Patent [19]

Horner

[11] Patent Number: 4,739,648
[45] Date of Patent: Apr. 26, 1988

[54] METHODS AND SYSTEM FOR DETERMINING LEAKS IN UNDERGROUND LIQUID STORAGE TANKS AND THE LIKE

[76] Inventor: John A. Horner, 387 River Dr., Lagoon Beach, Bay City, Mich. 48706

[21] Appl. No.: 14,812

[22] Filed: Feb. 13, 1987

Related U.S. Application Data

[63] Continuation-in-part of Ser. No. 806,628, Dec. 9, 1985, Pat. No. 4,649,739.

[51] Int. Cl.$^4$ .............................................. G01M 3/26
[52] U.S. Cl. ......................................... 73/49.2; 73/299
[58] Field of Search ........................ 73/49.2, 299, 302

[56] References Cited

U.S. PATENT DOCUMENTS

| | | | |
|---|---|---|---|
| 3,538,746 | 11/1970 | Jacobs et al. | 73/49.2 |
| 4,646,560 | 3/1987 | Maresca et al. | 73/49.2 |

FOREIGN PATENT DOCUMENTS

| | | | |
|---|---|---|---|
| 1817676 | 6/1970 | Fed. Rep. of Germany | 73/49.2 |
| 2038126 | 2/1972 | Fed. Rep. of Germany | 73/49.2 |
| 2802930 | 7/1979 | Fed. Rep. of Germany | 73/49.2 |
| 394876 | 12/1965 | Switzerland | 73/49.2 |
| 276474 | 10/1970 | U.S.S.R. | 73/49.2 |
| 458728 | 3/1975 | U.S.S.R. | 73/49.2 |

*Primary Examiner*—Stewart J. Levy
*Assistant Examiner*—Joseph W. Roskos
*Attorney, Agent, or Firm*—Learman & McCulloch

[57] ABSTRACT

A system for detecting leaks over a designated test period in liquid storage tanks and like systems having underground tanks which are connected with good withdrawal systems. A fill pipe provides for obtaining a differential pressure measurement reflecting a difference in head of adjacent columns of liquid in the tank. One of the heads is stabilized at the beginning of the test, and prevented from changing as a result of any loss of liquid due to leak over the test period, while the other head is permitted to change with a lowering of surface level due to leaks. Both heads respond in the same way to a change in temperature which occurs during the test period. The differential pressure is monitored and any variation over the test time period is indicated.

7 Claims, 1 Drawing Sheet

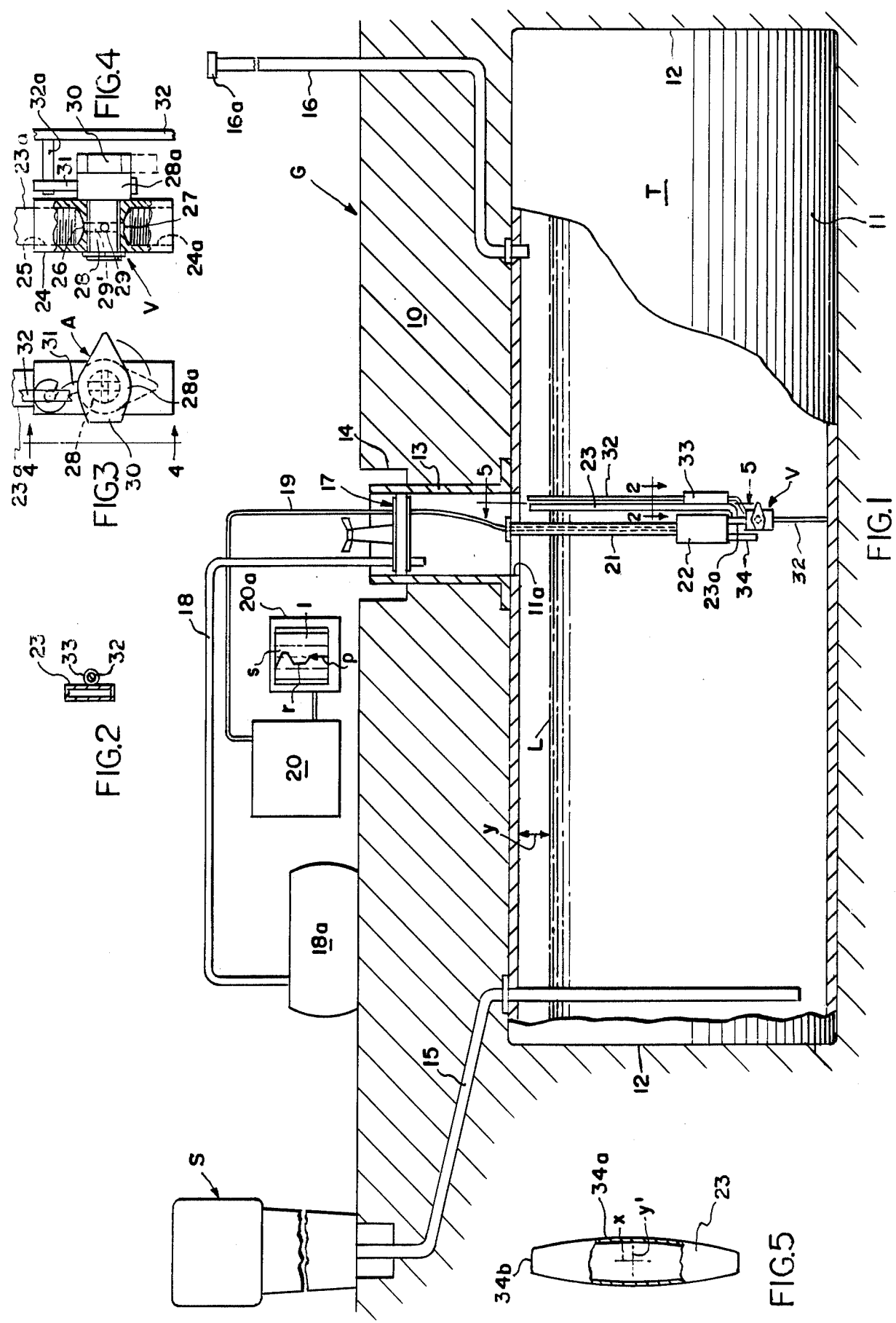

METHODS AND SYSTEM FOR DETERMINING LEAKS IN UNDERGROUND LIQUID STORAGE TANKS AND THE LIKE

The present application is a continuation-in-part of my application Ser. No. 806,628, filed Dec. 9, 1985 now U.S. Pat. No. 4,649,739.

BACKGROUND OF THE INVENTION

The aforementioned application is directed to a system for detecting leaks in installations such as underground gasoline storage tanks, which are connected with liquid withdrawal systems in the form of above-ground gasoline pumps at the service station. Such underground tank bodies have upwardly projecting fill and vent pipes. The previous system was designed to avoid the necessity of measuring and compensating for differences in the temperature of the liquid in the tank at various depths in order to accurately indicate the presence of a leak of a magnitude to necessitate repair or replacement of the tank.

State law in many jurisdictions requires, for example, that there be a periodic monitoring of such tanks, in a manner to achieve a leak detection of as little as 0.05 gallons per hour, and, of course, many operators, concerned with environmental considerations and eliminating potentially explosive conditions, seek even more stringent monitoring systems.

Among various systems which have been proposed previously, and which indicate the state of the art at the present time, are the following:

| 1,598,571 | Fox et al | 4,006,636 | Hohmen |
|---|---|---|---|
| 3,580,055 | White | 4,186,591 | Mooney |
| 3,587,316 | Kapteyn | 4,300,388 | Hansel et al |
| 3,818,752 | Lindeberg | 517,388 | Linder |
| 1,720,159 | Willmann | 3,961,532 | Kukuruzinski |
| 2,012,511 | Hubbard | 4,108,002 | Rowe et al |
| 2,853,874 | Mennesson | 4,362,403 | Mooney |
| 3,726,141 | Bremer et al | 4,472,969 | Templin |

My prior system utilized a bubbling technique, wherein a continuous stream of bubbles of air was forced into the liquid near the bottom of the tank and the resistance to air introduction, as influenced by the composite effect of the pressure of the gas on the level of liquid in the tank and the head of liquid at the level of gas introduction, was balanced against the static pressure of the gas in the space above the liquid as a reference pressure to note any differential pressure variation over a time period.

SUMMARY OF THE INVENTION

The present system does not employ the bubbling procedure, but rather captures the head of a column of liquid in the tank at the commencement of a test period as a reference pressure, and balances it against the head of an adjacent, same depth column which is affected by any leakage occurring during the test time period, to note any variation which indicates a leak in the system. This is accomplished via immersion of a transducer directly in the tank, and without any changes of temperature in the liquid affecting the results.

One of the prime objects of the present invention is to provide an improved system, wherein the measurements for differential indications taken during the test period are unaffected by variations in the temperature of the liquid in the tank because both the reference pressure and the pressure which is differentially imposed against it, are equally affected by any changes in temperature which occur.

Another object of the invention is to provide a system which is completely closed to atmosphere during the test procedure.

Still another object of the invention is to provide apparatus of a portable nature which may be readily inserted into existing tank installations for the purpose of detecting leaks in the tank, and then readily removed.

Still another object of the invention is to provide a highly reliable and accurate system, capable of much more than meeting monitoring statute requirements which have been legislated.

Still another object of the invention is to design a system which provides a tangible, visual indication of the variations in liquid level which occur over the test time period.

Other objects and advantages of the invention will be pointed out specifically, or will become apparent from the following description, when it is considered in conjunction with the appended claims and the accompanying drawings.

IN THE DRAWINGS

FIG. 1 is a schematic, side elevational view illustrating my testing system in place in an underground storage tank ready to commence a monitoring procedure;

FIG. 2 is an enlarged, fragmentary, sectional plan view, taken on the line 2—2 of FIG. 1, of a reference pressure tube within the tank which is isolated at the beginning of the test period to reflect a head pressure which is used as a reference pressure, the section being taken in the plane of the vertical axis of the cylindrical tank;

FIG. 3 is an enlarged, side elevational view, more particularly illustrating valve structure which is utilized to isolate the reference pressure, the chain lines indicating a different position of the valve actuator;

FIG. 4 is a partly sectional view, taken on the line 4—4 of FIG. 3; and

FIG. 5 is an elevational view of the reference pressure tube only, taken on the line 5—5 of FIG. 1.

Referring now more particularly to the accompanying drawings, a service station is indicated generally at G, and buried in the ground 10 is a cylindrical underground storage tank, generally designated T, which comprises a cylindrical wall 11, bounded by end walls 12. A fill pipe 13, integrated with the top of tank T at the vertical central axis x of the tank, forms an upwardly projecting extension of a fill opening 11a, which extends upwardly into a well 14 provided at ground level.

Pumping conduit 15, at one end of the tank, extends to a pumping station, generally designated S, from which gasoline may be dispensed by the usual nozzle to the vehicle requiring fuel. Except when the pump or dispenser S is pumping liquid gasoline L from the tank T, the line 15 is closed to atmosphere in the usual manner. The tank T is, however, open to atmopshere normally to vent gasoline fumes via a vent pipe 16, which communicates with the upper end of tank T at one end as shown in FIG. 1, vent conduit 16, however, having an adjustable cap 16a which can be closed to isolate the conduit 16 from atmosphere during a testing procedure.

When a monitoring procedure is to be performed, the usual cap or seal, which seals off the upper end of fill pipe 13 is removed, and a plumber's seal 17, which is part of the testing apparatus is inserted. The plumber's seal 17 is conventional in terms of its structure and operation, except that it carries and passes a tubular line or conduit 18, which communicates with a compressor 18a, and further carries and sealably passes an electrical conduit 19, which communicates with a signal processor or amplifier 20. The conduit 19 extends down into a conduit 21 connected with a transducer 22. Transducer 22 is a pressure transducer, and may be the differential pressure transmitter Model P8C(S), manufactured by Tavis Corporation, of Mariposa, Calif.

The transducer has a pair of opposite pressures imposed upon it and produces an output signal which changes linearly with the applied differential pressure. A direct current input voltage is connected with the transducer 22, via the current carrying lines in conduit 19 leading to the signal processor 20, and the output signal is also transmitted via the current carrying lines in conduit 19 to the processor 20.

A dependent tube system 23, has a portion 23a which connects with the transducer 22 to impose a reference pressure on it tube portion 23a mounts a valve V on its lower end, which may be selectively opened or closed by a valve actuator, generally designated A. Valve V comprises a fitting 24, with a passage 24a at its lower end (FIG. 4), communicatable with the passage 25 leading to tube portion 23a and transducer 22. The fitting passages 26 and 27 of reduced diameter can be communicated by a rotary actuator valve stem 28 having a through-port 29. When the port 29 is in the solid line position, shown in FIG. 4, valve actuator stem 28 sealably prevents communication with the passages 26 and 27. When it is in the chain line position shown at 29', liquid is permitted to flow up into the passage 25 to the transducer 22. The stem 28 has a hub 28a to which the actuating arm 30 is fixed, arm 30 being connected by an eye rod 31 and a tie rod 32a to a vertical actuating rod 32. The actuating rod 32 is vertically, slidably carried by a slide bearing 33 rigidly connected to tube 23 which is of a predetermined configuration of the character disclosed in FIGS. 2 and 5.

The portion of tube system 23 which connects to portion 23a, as shown in FIG. 5, has vertically curvilinear sides 34a throughout its length conformed proportionately to the curvilinearity of the curvilinear sides of cylindrical tank T. It has flat ends 34b. The sides 34a are curved to reflect the volume condition of a column of liquid in cylindrical tank T which has the same pressure vertically over its length as occurs in tank T. Thus, a tube, which at the horizontal center y' of a tank T having a diameter of four feet, has a width of one inch would have the arc of sides 34a taken about a radius on the line y' of 576.25 inches. A tube 34 leads separately into the transducer 22. The transducer 22 may have a tube coil, diaphragm or like member reactive to the differential in the opposed pressures in lines 23 and 34, so that any differential pressure is outputted by the transducer 22 as an electrical signal in, for example, the 4 to 20 milliamp range. The signal is transmitted to processor 20 and chart recorder 20a which may be of the type described in my previously mentioned copending application.

The transducer 22 could be of the character disclosed in U.S. Pat. No. 4,006,636 which is of the diaphragm type, or alternatively, it could be of the helical Bourdon tube type and could be a quartz pressure transducer of the type described in my aforementioned application, which utilizes a Bourdon tube within a pressurized casing to sense a differential pressure. In this type of device, one end of the pipe 34 connects to the open end of the Bourdon tube which reacts to a decreased pressure to rotate a mirror whose deflection is optically sensed. The other pipe 23a connects to the closed and sealed interior of a casing housing the Bourdon tube so that the pressure inside the casing acts in opposition to the pressure in the Bourdon tube. Such transducers are commercially available and may include a potentiometer system which normally is balanced, but, when unbalanced, translates the pressure differential as an electrical signal which varies according to the amplitude of the pressure differential. This output signal is electronically filtered and amplified many times in the processor which may be termed a precision offset device, and the signal is translated to pen movement on the strip chart recorder or indicator 20a. The strip chart recorder is also commercially available and may, for example, be a strip chart recorder of the type manufactured by Dianachart, Inc. of Rockaway, N.J. The input to recorder 20a modulates or electrically controls a driven pen drive motor (which is connected with a suitable power supply), to translate any variation in input signal to proportional mechanical movement of the pen of the recorder with respect to a chart reference line in the usual manner.

THE OPERATION

At the beginning of the test procedure, the service station's seal is removed from the fill tank 13 and the testing device is inserted in the manner indicated in FIG. 1 until the rod 32 is felt to engage the bottom of tank T. Initially the valve 30 will be in the vertical position, indicated by the chain lines in FIGS. 3 and 4, and liquid L will be admitted to the line 23a to impose a reference pressure on transducer 22. Downward pressure on the rod 32 then will swing the valve arm 30 through a 90° arc to turn valve stem 28 and seal off the liquid-filled tube system 23, the rod 32 sliding in slide bearing 33 to accomplish this valve closing motion.

At this time, with tube system 23 open to the pressure in the space y above the liquid level L, there should be no differential pressure because the head pressure in both instances is the same, the pressures being oppositely applied to the differential pressure receiving member in transducer 22 at the same depth. The compressor 18a is utilized to provide a low pressure on the order of 2 p.s.i. in the space y just after insertion of the test apparatus and before the valve V is closed. The fill pipe 13 is, of course, normally located at the vertical center of tank T cross-sectionally.

With valve V closed, the pressure of the liquid in tube system 23 is captured at the beginning of the test and isolated so that it remains, unless there are temperature changes, which, however, affect both the pressures in tube system 23 and tube 34 equally. It does not, accordingly, react to any change in the level of liquid L during the test period, whereas liquid in the tube 34 will change in head pressure if there is a leak. Any slight leakage indicated by any differential pressure change translated by the transducer 22 into an electrical signal is filtered and amplified by the amplifier 20 and translated by the linear potentiometer or control driving the pen p, operating on the vertically aligned (at 1) chart of the vertically moving paper strip of the paper strip recorder 20a, to trace a differential indicating reference line r. Any leakage of as little as 6 ounces in an hour will be accurately indicated by the continuously moving paper strip s on which the line r is marked by pen p. There are also digital readouts on the amplifier 20 which can be monitored. With a pressure maintained in the space y, a high water table will not affect the differential result. In other systems, a change in temperature of 1° during the test period, can result in an error of as much as 0.01 inches. With the present system, wherein change of temperature affects both opposed pressures identically, the system may be said to be self-compensating vis-a-vis temperature change. It is believed that the present system can be accurate to 0.0001 inches under these circumstances.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. A method for detecting leaks in liquid storage tanks and like systems, having tank bodies with projecting fill and vent pipes, which systems are connected with a liquid withdrawal system normally isolated from the atmosphere, and are filled only to an extent to leave a top space in the body of the tank above the liquid surface level comprising the steps of:
   a. filling the space in the body of the tank above the surface with a gas under a pressure greater than atmospheric and maintaining the gaseous pressure on the liquid surface in the tank from one end of the body of the tank to the other, and further maintaining the pipes empty of the liquid in the tank and isolated from the pressure of the atmosphere;
   b. inserting within the liquid in the tank a valved differential pressure transducer device having a pair of inlets, one of which receives a valve closable tubular part which is open to the said space, for reflecting the head of a column of water at a predetermined level under the pressure maintained in said space, closing off said tubular part at the beginning of a test period to isolate the head as a reference pressure which is unaffected by tank leakage over the test period, and balancing it against a head pressure imposed on said other inlet and reactive also to the pressure in said space and to tank leakage to obtain a differential pressure signal; and
   (c) monitoring the differential pressure signal and indicating a variation therein over a test time period.

2. A self-contained unit for use with a tank body having projecting fill and vent conduits, which tank is connected with a liquid withdrawal system normally isolated from the atmosphere, and filled only to an extent to leave a top space on the body of the tank above the liquid surface level, the unit being used in measuring the rate of liquid leak from the tank, comprising:
   a. means for filling the space in the body of the tank above the surface with a gas under a pressure greater than atmospheric and maintaining a gaseous pressure on the liquid surface in the tank from one end of the body of the tank to the other, and for maintaining the conduits empty of liquid and isolated from the pressure of the atmosphere;
   b. a differential pressure measuring device for disposition in the body of liquid in said tank, disposed within a sealed casing and having a pair of inlets open through said casing for imposing opposite pressure to be balanced;
   c. a pipe member connected to a first one of said inlets and extending upwardly from the differential pressure measuring device to project above the surface of the liquid in the tank;
   d. a valve member having a valve actuator connected with said pipe member to open and close said pipe member to the passage of a liquid;
   e. means for operating said actuator and moving said valve from an open position at the beginning of the test to a closed position in which the head of liquid at the first inlet is unaffected by any leak which occurs in the tank over the duration of the test period, and
   f. means connected with the said device for remotely monitoring a signal indicating an unbalanced condition of said device.

3. The system of claim 2 wherein said differential pressure measuring device comprises a pressure transducer, which is immersed in said liquid at said depth and produces an electrical signal proportionate linearly to the degree of differential pressure sensed.

4. The unit of claim 2 wherein said latter means includes an electrical conduit leading from said device to a remote location exteriorly of said tank, and an electrical circuit reactive to a differential pressure to transmit an electrical signal, and indicator means operated in response to said signal to indicate the existence of a leak.

5. The combination defined in claim 2 in which said pipe has curvilinear side walls proportionately curvate with the cylindrical configuration of said tank.

6. The invention defined in claim 2, wherein said pipe vertically slidably supports an actuator rod connected with said valve actuator.

7. The invention defined in claim 2, in which an actuator rod connected with said valve actuator extends a predetermined distance below said valve actuator in a position to engage the bottom of the tank, said actuating rod being vertically slidably supported with respect to said device such that downward force exerted on the actuating rod when it is in engagement with the bottom of the tank causes it to close said valve actuator.

* * * * *